United States Patent
Chong et al.

[11] Patent Number: 5,864,538
[45] Date of Patent: Jan. 26, 1999

[54] FIRST-ORDER RATE-BASED FLOW CONTROL WITH ADAPTIVE QUEUE THRESHOLD FOR ATM NETWORKS

[75] Inventors: Song Chong, Middletown; Ramesh Nagarajan, Aberdeen; Yung-Terng Wang, Marlboro, all of N.J.

[73] Assignee: Lucent Technologies Inc., Murray Hill, N.J.

[21] Appl. No.: 697,469

[22] Filed: Aug. 26, 1996

[51] Int. Cl.⁶ ................................................. H04L 12/56
[52] U.S. Cl. .......................................... 370/235; 370/395
[58] Field of Search ................................... 370/235, 224, 370/230, 231, 232, 233, 234, 236, 238, 252, 389, 395, 468, 477

[56] References Cited

U.S. PATENT DOCUMENTS 5,426,635   6/1995  Mitra et al. ............................... 370/229
5,457,687  10/1995  Newman .................................. 370/232

Primary Examiner—Dang Ton
Attorney, Agent, or Firm—Steven R. Bartholomew

[57] ABSTRACT

Novel rate-based flow control methods operate in conjunction with a data communications network. Such networks include a plurality of interconnected nodes, wherein each node is adapted for connection to any of a plurality of sources. The sources send data to, and receive data from, the nodes. The path that data follows in traveling from a first source, through one or more nodes, to a second source, is referred to as a virtual circuit path. Each node includes a processor and an associated memory for storing a data queue of data received from sources. According to one embodiment, referred to as first-order rate-based flow control, a node allocates a data transfer rate to a source based upon the difference between the current queue length at that node and the queue threshold of that node multiplied by a gain. If an appropriate value is calculated and/or empirically determined for the gain, the closed-loop system is asymptotically stable with no persistent oscillation, irrespective of the number of node-to-node connections in a given virtual circuit path, and the round-trip delay of this virtual circuit path. First-order rate-based flow control maintains high node-to-node link utilization and low data loss.

4 Claims, 6 Drawing Sheets

SOLUTION 1 ———
SOLUTION 2 ········

$K_i$ =0.2 ———
$K_i$ =0.3 ·········
$K_i$ =0.6 – – – –

DYNAMIC THRESHOLD ———
STATIC THRESHOLD ·········

DYNAMIC THRESHOLD ·········
STATIC THRESHOLD – – – –

DYNAMIC THRESHOLD ·········
STATIC THRESHOLD – – – –

DYNAMIC THRESHOLD ———
STATIC THRESHOLD – – –

VC ARRIVING AT 0sec ———
VC ARRIVING AT 1sec ----------
VC ARRIVING AT 2sec – – –

FIRST-ORDER RATE-BASED FLOW CONTROL WITH ADAPTIVE QUEUE THRESHOLD FOR ATM NETWORKS

BACKGROUND OF THE INVENTION

1. Field of the Invention

The invention relates generally to data communications, and more particularly to data switching arrangements.

2. Description of Related Art

Recent developmental efforts have focused upon feedback-based flow control in the operational environment of high-speed, wide-area ATM networking. In particular, an explicit rate-based approach has been studied extensively and adopted by the ATM Forum as a standard for the flow control of Available Bit Rate (ABR) service. An illustrative rate-based flow control problem may be stated as follows, with reference to FIG. 1. Consider a network 100 that includes a plurality of nodes 102, 104, 106, 108. (These nodes 102, 104, 106, 108 could also be conceptualized as representing switches.). A first source 110 at a first geographic location transmits data into node 102, and a second source 112 at a second geographic location transmits data into node 104.

The first source 110 transmits data into node 102 at a data transfer rate allocated by node 102, and the second source transmits data into node 104 at a data transfer rate allocated by node 104. Node 102 allocates a data transfer rate to first source 110 based upon a virtual circuit path 115 over which data from node 102 is to travel, and node 104 allocates a data transfer rate to second source 112 based upon a virtual circuit path 117 over which data from node 104 is to travel. In allocating data transfer rates among sources 110, 112, each node 102, 104, 106, 108 computes the rate that will be allocated to each of the active sources whose virtual circuit path is routed through that node 102, 104, 106, 108. These computed rates are conveyed from a given node 102, 104, 106, 108 to the sources connected to that node via a data structure termed a resource management (RM) cell.

An RM cell is generated by, and transmitted on, a given virtual circuit path 115 by a source 110. The RM cell includes a data field that contains the minimum circuit path 115 to the source 102 during a round trip of data from the source 102 to a destination source, and back to source 102 along the virtual circuit path 115. For a wide-area network in which the end-to-end round-trip propagation delay is relatively large, the rate allocation carried by an RM cell may no longer be valid in view of the current status of the network, and so immediate, real-time flow control cannot be performed. In this scenario, there is an increasing likelihood of cell loss and link under-utilization. Particularly as link speed increases (i.e., the speed of the communications links connecting a pair of nodes 102, 104), this problem becomes more serious, due to the large bandwidth-delay product involved in the closed loop.

Methods by which a node processor allocates data transfer rates are classified are into one of two types: queue-length-based rate control, and explicit rate allocation. In queue-length-based rate control, the rate to a source is calculated as a function of the difference between the queue length and the queue threshold, based on the measurement of the queue length. In this type of approach, a desired fairness in rate allocation (e.g., MAX-MIN fairness) among sources is accomplished as a consequence of the queue-length control. Examples of this type of algorithm are found in F. Bonomi, D. Mitra and J. B. Seery, "Adaptive Algorithms for Feedback-Based Flow Control in High-Speed, Wide-Area Networks", *IEEE J. Select. Areas on Communications*, Vol. 13, No. 7, Sep. 1995, pp. 1267–1283, and S. Mascolo, D. Cavendish and M. Gerla, "ATM Rate Based Congestion Control Using a Smith Predictor: an EPRCA Implementation", *Proc. of IEEE INFOCOM '96*, March 1996, pp. 569–576. In an explicit rate allocation approach, instead of controlling the queue-length explicitly, the switch computes the rate to a source based on an asynchronous distributed algorithm that is designed to accomplish a desired fairness in rate allocation. Examples of this type of algorithm are found in L. Kalampoukas, A. Varma and K. K. Ramakrishnan, "An Efficient Rate Allocation Algorithm for ATM Networks Providing Max-Min Fairness," Technical Report UCSC-CRL-95-29, Computer Engineering Dept., University of California, Santa Cruz, June 1995, and D. Bertsekas and R. Gallager, *Data Networks*, Prentice Hall, 1992.

SUMMARY OF THE INVENTION

Novel rate-based flow control methods are described which operate in conjunction with a data communications network. Such networks include a plurality of interconnected nodes, wherein each node is adapted for connection to any of a plurality of sources. The sources send data to, and receive data from, the nodes. The path that data follows in traveling from a first source, through one or more nodes, to a second source, is referred to as a virtual circuit path. Each node includes a processor and an associated memory for storing a data queue of data received from sources.

According to one embodiment disclosed herein, referred to as first-order rate-based flow control, a node allocates a data transfer rate to a source based upon the difference between the current queue length at that node and the queue threshold of that node multiplied by a gain. If an appropriate value is calculated and/or empirically determined for the gain, the closed-loop system is asymptotically stable with no persistent oscillation, irrespective of the number of node-to-node connections in a given virtual circuit path, and the round-trip delay of this virtual circuit path. First-order rate-based flow control maintains high node-to-node link utilization and low data loss. Also, any desired fairness in bandwidth allocation among node-to-node connections may be provided by weighting the gain values of respective nodes.

A further embodiment of the first-order, rate-based flow control method adaptively changes the queue threshold at each of the nodes along a given virtual circuit path, based upon changes in available bandwidth, and also based upon the establishment and/or discontinuance of source connections at each of the nodes in a given virtual circuit path. Therefore, this adaptive method is equipped to provide flow control in a dynamic environment where available bandwidth varies, and connections are frequently made and then broken.

DETAILED DESCRIPTION OF THE PREFERRED EMBODIMENTS

Figure 1:
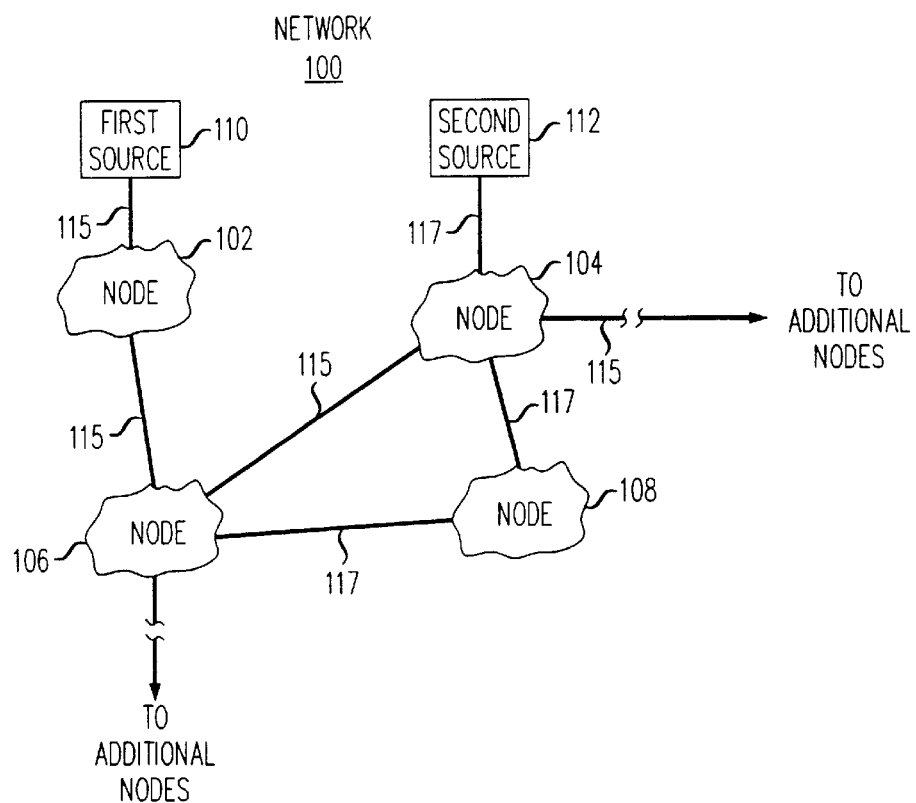
FIG. 1 is a hardware block diagram of a prior-art network.

There are a number of performance objectives in the design of rate-based flow control: (1) the queue length at switches, and the actual transmission rates of sources, should each be asymptotically stable, i.e., converge to an equilibrium point, with no persistent oscillation; (2) the flow control method should maintain high link utilization and low cell loss; (3) the flow control method should achieve a desired fairness in rate allocation among various virtual circuit paths (e.g. MAX-MIN fairness); and (4). The flow control method should be simple so as to enable efficient performance by a node processor.

In particular, it is highly desirable that a flow control method utilize a common queue that is statistically shared in the time domain by all of the virtual circuit paths routed to a given node, and that is served via a FIFO service discipline. Also, in order to scale flow control with a given number of virtual circuit paths as node-to-node link speed is increased, the method should be computationally simple. A flow control method should maintain the previously-described performance in a dynamic environment where available bandwidth and active virtual circuit paths change with time.

The first-order rate-based flow control method meets the aforementioned objectives. For example, the method disclosed herein operates in conjunction with a first-in-first-out (FIFO) service discipline and a common queue that is statistically shared in the time domain by all the connections. When an appropriate value for the gain parameter is selected and/or empirically determined, the closed-loop system is asymptotically stable with no persistent oscillation, irrespective of the magnitude of the round-trip delay of the node-to-node connections comprising a given virtual circuit path. Consequently, these flow control methods maintain high link utilization and low cell loss. Also, one can easily accomplish a desired fairness in bandwidth allocation among virtual circuit paths by properly weighting the gains. The transient behavior of the closed-loop system is favorable even with large virtual circuit path bandwidth-delay products. Moreover, the first-order, rate-based flow control method complies with the ATM standard for ABR (Available Bit Rate) service, and is a promising solution for ABR flow control in high-speed wide-area ATM networks.

The first-order rate-based flow control method differs from the queue-length-based rate control methods disclosed in the Bonomi et al reference and in A. Elwalid, "Analysis of Adaptive Rate-Based Congestion Control for High-Speed Wide-Area Networks", *Proc. of IEEE ICC '95*, 1995, pp 1948–1953. in that the method disclosed herein allocates a data transfer rate to a source that is the difference between the current queue length threshold multiplied by a weighted gain. By contrast, in the methods described in the Bonomi et al and Elwalid references, the data transfer rate is controlled via its derivative. The first-order rate-based flow control method also differs from a prior art method developed in the Mascolo et al reference in that the flow control method disclosed herein acts on a common queue shared in the time domain and served via a FIFO discipline. Use of a common queue eliminates the prior art requirement of per-virtual-circuit queuing, and it also eliminates the need for a special service discipline, such as a round-robin discipline.

To further improve the performance of the flow control method disclosed herein, a further embodiment adaptively changes the queue threshold in response to changes in the available bandwidth and changes in the making and breaking of node connections. This further embodiment may be referred to as the adaptive queue threshold (AQT) embodiment. The only measurement required by the first-order rate-based flow control method is the current queue length. In order to implement the AQT embodiment of first-order rate-based flow control, the node processor must monitor the currently-available bandwidth, as well as the set of currently-active virtual circuit paths passing through that node. Such a computational and implementation simplicity makes the first-order rate-based flow control method scale well with the number of virtual circuits as the network speed increases.

Mathematically, the rate-based flow control method disclosed herein may be represented by the equation:

$$r_i(t) = -K_i(q(t-\tau_i^b/i) - q_T) + v_i \qquad (1)$$

$K_i > 0$, $v_i \geq 0$, $i = 1, \ldots, n$ where $K_i$ is the weighted control gain, $q_T$ is the queue length threshold and $v_i$ is the minimum data transfer rate, in units of cells, required by a source. $r_i(t)=1, \ldots, n$ denotes the actual transmission rate of virtual circuit i at the source at time t. $q(t)$ and $\mu$ respectively denote the queue length at time t, and the available bandwidth at a network node of interest. $\tau_i$ is the round-trip delay of virtual circuit i, which is equal to the sum of the forward-path delay, $\tau_i^f$ and the backward-path delay, $\tau_i^b$. This method is termed first-order rate-based flow control because the behavior of the closed-loop system with this method is governed by first-order dynamics.

Figure 2:
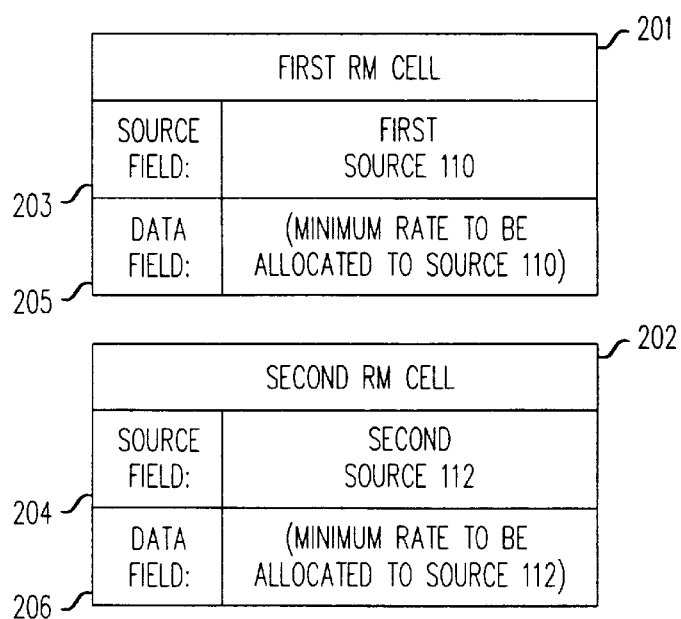
FIG. 2 is a data structure diagram showing data structures for first and second rate allocation (RM) cells.

Refer to FIG. 2 which shows illustrative data structures for a first RM cell 201 and a second RM cell 202. Each RM cell 201, 202 includes a source field 203, 204, respectively, and a data field 205, 206, respectively. Each source field 203, 204 specifies a source such as, for example, first source 110 (FIG. 1) in the case of source field 203 (FIG. 2) of first RM cell 201, and second source 112 (FIG. 1) in the case source field 204 (FIG. 2) of second RM cell 202. The data fields 205, 206, respectively, contain the minimum data transfer rate to be allocated to the source specified in the corresponding source field 203, 204 of the respective RM cell 201, 202. The node processor, i.e., a processor, for example, at node 102 (FIG. 1) monitors the current queue length and computes the rate allocation among virtual circuit paths, to be described in more detail below.

Figure 3:
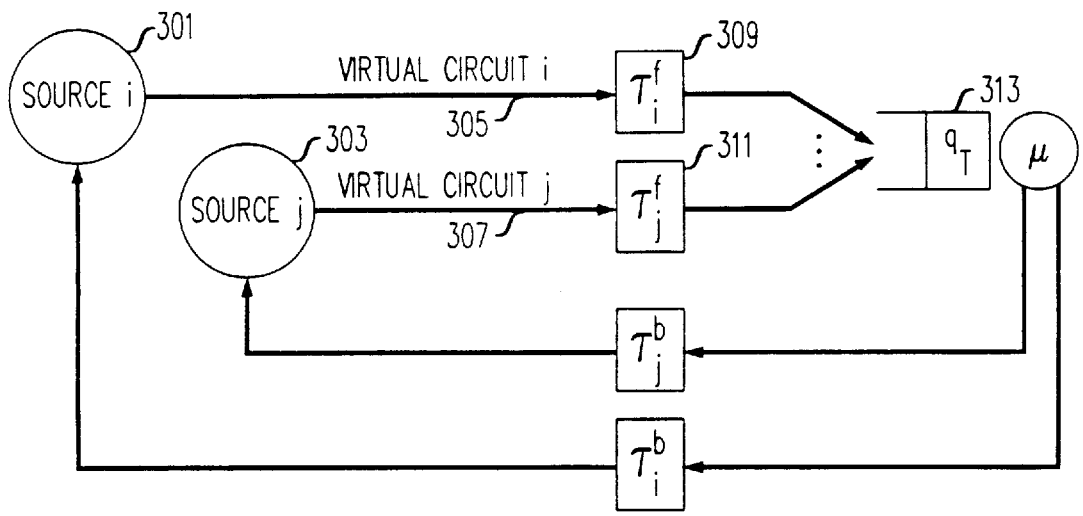
FIG. 3 is a hardware block diagram showing a plurality of data sources coupled to a corresponding plurality of virtual circuits.

FIG. 3 shows a plurality of sources including source i 301 and source j 303. Each source 301, 303 is associated with a corresponding virtual circuit, such as virtual circuit i 305 in the case of source i 301, and virtual circuit j 307 in the case of source j 303. The calculated rates are delivered to the corresponding sources 301, 303 using RM cells 309, 311 with $\tau_i b$ amount of delay. In contrast, the prior art methods described in the Bonomi et al and Elwalid references are viewed as second-order flow control methods since the rate itself is computed via first-order dynamics, and so the closed-loop system is governed by second-order dynamics. Such second-order flow control methods are mathematically represented as:

$$\dot{r}_i(t) = -A\tau_i(t) + B_i(q(t-\tau^b_i) - q_T), A, B_i > 0. \quad (2)$$

The performance of the first-order rate-based flow control method will now be examined from a control-theoretic point of view. Simplifying somewhat, the queuing process at a network node, denoted as $\dot{q}(t)$ 313 (FIG. 3), may be mathematically denoted as the sum of the following terms:

$$\dot{q}(t) = \begin{cases} \sum_{i=1}^{n} r_i(t-\tau_i^f) - \mu, & q(t) > 0 \\ \left(\sum_{i=1}^{n} r_i(t-\tau_i^f) - \mu\right)^+, & q(t) = 0 \end{cases} \quad (3)$$

where $(\bullet)^+$ denotes max $\{\bullet, 0\}$. Consider the closed-loop behavior with no buffer floor. Define $$e(t) = q(t) - q_T + \frac{\mu - \sum_{i=1}^{n} v_i}{\sum_{i=1}^{n} K_i} \quad (4)$$

By combining (3), (1) and (4), we have $$\dot{e}(t) + \sum_{i=1}^{n} K_i(t - \tau_i) = 0. \quad (5)$$

By using analytical procedures related to the stability of retarded dynamical systems as described in G. Stepan, *Retarded Dynamical Systems: Stability and Characteristic Functions*, Longman Scientific & Technical, 1989, one can show that the closed-loop system of equation (5) is asymptotically stable if the gains of virtual circuits are chosen such that $$\sum_{i=1}^{n} K_i \tau_i < 1. \quad (6)$$

The term asymptotically stability means that the queue length q(t) at the switch and the transmission rate $r_i(t)$ of the sources respectively converge to an equilibrium point so that there is no persistent oscillation in the steady state. In practice, this is a highly desirable property in that the likelihood of node-to-node link under-utilization and cell loss is substantially reduced, and the sources are able to transmit data at a steady rate. In order to ensure asymptotic stability with an increased number of virtual circuit paths, and/or an increased round-trip delay of virtual circuit paths, somewhat smaller values for the gain parameter should be chosen, such that the condition (6) is satisfied.

Let $q_\infty$ and $r_{i\infty}$ respectively, denote the steady-state solution of q(t) and $r_i t$. When the first-order rate-based flow control method is applied, there are two steady-state solutions: If $$q_T > \frac{\mu - \sum_{i=1}^{n} v_i}{\sum_{i=1}^{n} K_i},$$

$$q_\infty = q_T - q_T > \frac{\mu - \sum_{i=1}^{n} v_i}{\sum_{i=1}^{n} K_i}; \tau_{i\infty} = \frac{K_i}{\sum_{i=1}^{n} K_i}\left(\mu - \sum_{i=1}^{n} v_i\right) + v_i, \forall i, \quad (7)$$

otherwise, $$q_\infty = 0; \, r_{i\infty} = K_i q_T + v_i \forall i, \quad (8)$$

This implies that if the queue length threshold is chosen such that $$q_T > \frac{\mu - \sum_{i=1}^{n} v_i}{\sum_{i=1}^{n} K_i}$$

the link is fully utilized and each source gets $$\frac{K_i}{\sum_{i=1}^{n} K_i}\left(\mu - \sum_{i=1}^{n} v_i + v_i\right)$$

the amount of bandwidth allocation in the steady state. In addition, if $\mu \geq \Sigma^n_{i=1} v_i$ is satisfied, it is guaranteed that each source gets a bandwidth allocation greater than or equal to the minimum cell rate requirement $v_i$ in steady state. A desired share of the residual bandwidth $\mu \geq \Sigma^n_{i=1} v_i$ among virtual circuit paths can be easily controlled by properly weighting the gains $K_i$, i=1, . . . , n. An illustrative case is to choose identical gains across virtual circuit paths, which is commonly known as minimum cell rate plus MAX-MIN fair share, as described in *ATM Forum Traffic Management Specification Version* 1.0, Feb. 1996. In order for minimum cell rate guarantee, an admission control is required to ensure $\mu \geq \Sigma^n_{i=1} v_i$ is always satisfied.

Next, consider an adaptive queue threshold embodiment of the first-order rate-based flow control method. The analysis set forth above examines the asymptotic stability and steady-state performance of flow control in a static environment where the link bandwidth $\mu$ and the set of active virtual circuit paths are assumed to be unchanging with time. In reality, however, the available bandwidth is time-varying since it depends on the current aggregate traffic of higher-priority services, for example, CBR and real-time/non-real-time VBR traffic in ATM networks. Also, the set of active virtual circuit paths keeps changing, due to the generally frequent formation and disillusion of virtual circuit paths.

One of the major problems in such a dynamic environment is that the quantity $$\frac{\mu - \sum_{i=1}^{n} v_i}{\sum_{i=1}^{n} K_i}$$

changes and hence, as seen in equation (7), the equilibrium point of the system varies. More specifically, if $$\frac{\mu - \sum_{i=1}^{n} v_i}{\sum_{i=1}^{n} K_i}$$

grows and exceeds $q_T$ due to the changes of $\mu$ and the set of active virtual circuit paths, the link would become under-utilized and the queue would converge to zero. On the other hand, if a value is selected for $q_T$ that is large enough to avoid such an under-utilization of link bandwidth, $q_\infty$ would then increase, and so would the likelihood of cell loss (assuming that buffer size is fixed).

What is desirable in such a dynamic environment is the capability to keep $$q_T - \frac{\mu - \sum_{i=1}^{n} v_i}{\sum_{i=1}^{n} K_i}$$

constant and positive. To accomplish this, the switch can adaptively change either $q_T$ or the control gains whenever the changes in $\mu$ and the set of active virtual circuit paths are detected. Considering the large number of virtual circuit paths in a high speed link, the methods disclosed herein adopt the former option.

The adaptive queue threshold (AQT) method disclosed herein changes queue thresholds according to the following mathematical relationship:

$$q_T(t) = \frac{\mu(t) - \sum_{i \in I(t)} v_i}{\sum_{i \in I(t)} K_i} + \epsilon, \epsilon > 0 \quad (9)$$

where $\mu(t)$ and $I(t)$ respectively denote time-varying available bandwidth and set of active virtual circuits, and $\epsilon$ is an arbitrarily-determined design parameter. Consider closed-loop system behavior (with no buffer floor) when the first-order rate-based flow control with AQT is applied. For simplicity, assume that only $\mu$ is time-varying while the set of virtual circuit paths is unchanged. Then, by combining (3), (1) and (9), the following closed-loop equation is obtained:

$$\dot{q}(t) + \sum_{i=1}^{n} K_i q(t - \tau_i) = \epsilon \sum_{i=1}^{n} K_i - \mu(t) + \sum_{i=1}^{n} \frac{K_i}{\sum_{i=1}^{n} K_i} \mu(t - \tau_i). \quad (10)$$

In contrast, the closed-loop equation (5) in the case of static $q_T$ can be rewritten as $$\dot{q}(t) + \sum_{i=1}^{n} K_i q(t - \tau_i) = q_T \sum_{i=1}^{n} K_i - \mu(t) \quad (11)$$

with time-varying $\mu(t)$.

Equations (10) and (11) reveal that the major difference between the AQT embodiment and the static queue threshold method (i.e., first-order rate-based flow control without AQT) is the third term in the right-hand side of the AQT equation, equation (10). The role of this term is to nullify the effect of time-varying $\mu(t)$. with delays. In particular, if $\mu(t)$. varies slowly or is piecewise constant with reasonably long intervals, the term $$-\mu(t) + \sum_{i=1}^{n} \frac{K_i}{\sum_{i=1}^{n} K_i} (t - \tau_i)$$

remains small in magnitude, or as a superposition of impulses, so that the effect of $\mu(t)$ becomes nearly nullified as the system approaches a steady state. In contrast, with a static threshold, the effect of $\mu(t)$. remains, and governs the dynamics of q(t), as is revealed in equation (11).

The enhanced performance of first-order rate-based flow control with AQT, as applied in a dynamic environment, may be further characterized by simulating a network. For simplicity, assume that $v_i=0$ for all virtual circuit paths. First, consider a static scenario. The link bandwidth $\mu$ and the buffer size $\beta$ are respectively set to 150 Mbps and 5,000 cells, and there are 50 active virtual circuits sourcing data traffic into the node-to-node link. Values for the round-trip delay $\tau_i$ of the virtual circuit paths are selected in the range of [10, 40] msec to represent long propagation delays. To take into account the discrete-time effect of control, the first-order rate-based flow control is applied in the sample-and-hold manner with intervals defined by the rate of the virtual circuit path. This interval is selected to be aggressively long, as if RM cells are issued at every 128 data cells.

Figure 4:
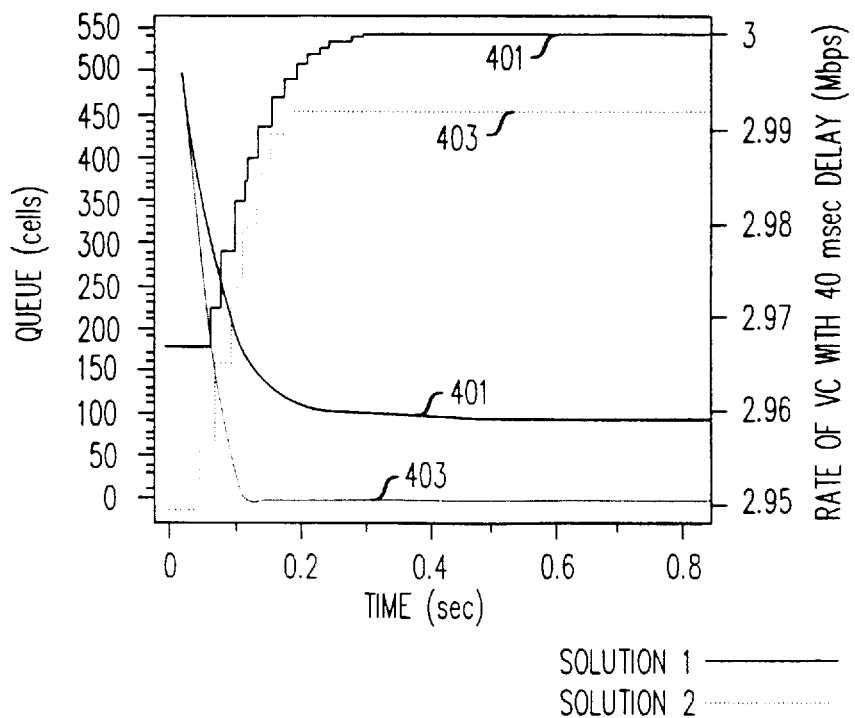
FIGS. 4 and 5 are graphs showing the relationship between time, queue length in cells, and the transfer rates of virtual circuits.

FIG. 4 shows the two steady-state solutions set forth in equations (7) and (8), with $K_i=0.2$, $\forall_i$, and q(0)=500 cells, as curve 401 for a first solution and curve 403 for a second solution. If we choose $q_T$ at 35,477 cells, the queue q(t) approaches 100 cells and the user rate $r_i(t)$ converges to the fair allocation (=3 Mbps) as time goes. For the illustration, the rate trajectory of a virtual circuit path with 40 msec round-trip delay is plotted in the figure. On the other hand, if we choose $q_T$ at 35,277 cells, q(t) converges to 0 and $r_i(t)$ approaches 2.9915 Mbps as computed in (8). Notice that it is not necessary for $q_T$ to be smaller than the buffer size $\beta$.

Figure 5:
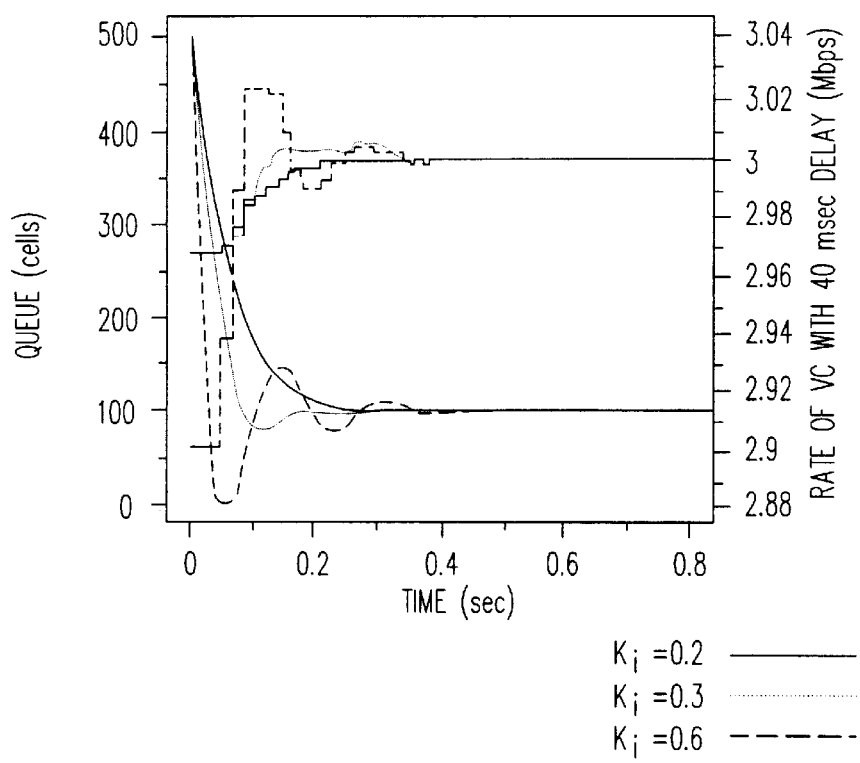

FIG. 5 shows the effect of control gains on the queue and user rates for three illustrative vales of $K_i$: 0.2, 0.3 and 0.6. While changing the gain, keep $\epsilon$ $$\left( = q_T - \frac{\mu - \sum_{i=1}^{n} v_i}{\sum_{i=1}^{n} K_i} \right)$$

positive and constant at 100 cells by changing $q_T$ correspondingly. FIG. 5 shows that, with increasing $K_i$, the system suffers from poor transient behavior such as overshoots at the risk of link under-utilization and cell loss. Therefore, in the remaining scenarios discussed below, $K_i$ is kept equal to 0.2.

Figure 6:
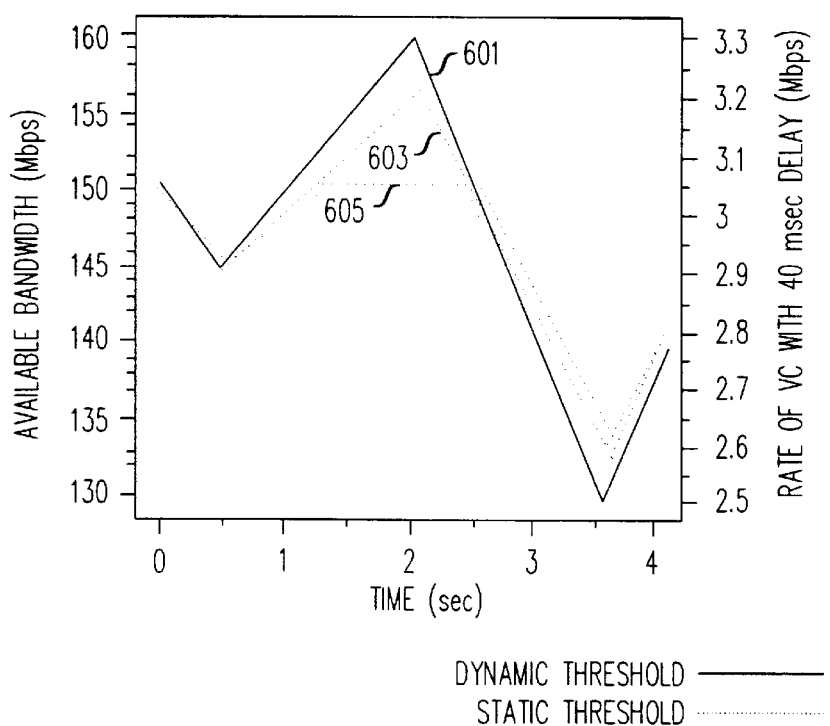
FIG. 6 is a graph showing the relationship between time, queue length in cells, and the transfer rates of virtual circuits.

Next, consider dynamic environments where $\mu$ and the set of active virtual circuit paths are varying. For the first-order rate-based flow control with static threshold, set $q_T$ at 35,877 cells, aiming at q$\infty$=500 cells, with $\mu(0)$=150 Mbps. This design implies that if $\mu$ does not vary, q(t) will converge to 500 cells. For the first-order rate-based flow control with adaptive queue threshold (AQT) in (9), $\epsilon$ was fixed at 500 cells. First, change $\mu(t)$ continuously in time with the derivatives of ±10 and ±20 Mbps/sec and apply the first-order rate-based flow control with/without AQT. The trajectory of $\mu(t)$ is plotted in FIG. 6 as solid curve 601. Also in FIG. 6, the user rate $r_i(t)$ of a virtual circuit path with longest round-trip delay (=40 msec) is compared for two cases: AQT, as curve 603, and static threshold as curve 605. With AQT $r_i(t)$ tracks well $\mu$ with a time lag, whereas without AQT $r_i(t)$ suffers from loss of bandwidth as observed during the time interval [1.25, 2.5] sec.

Figure 7:
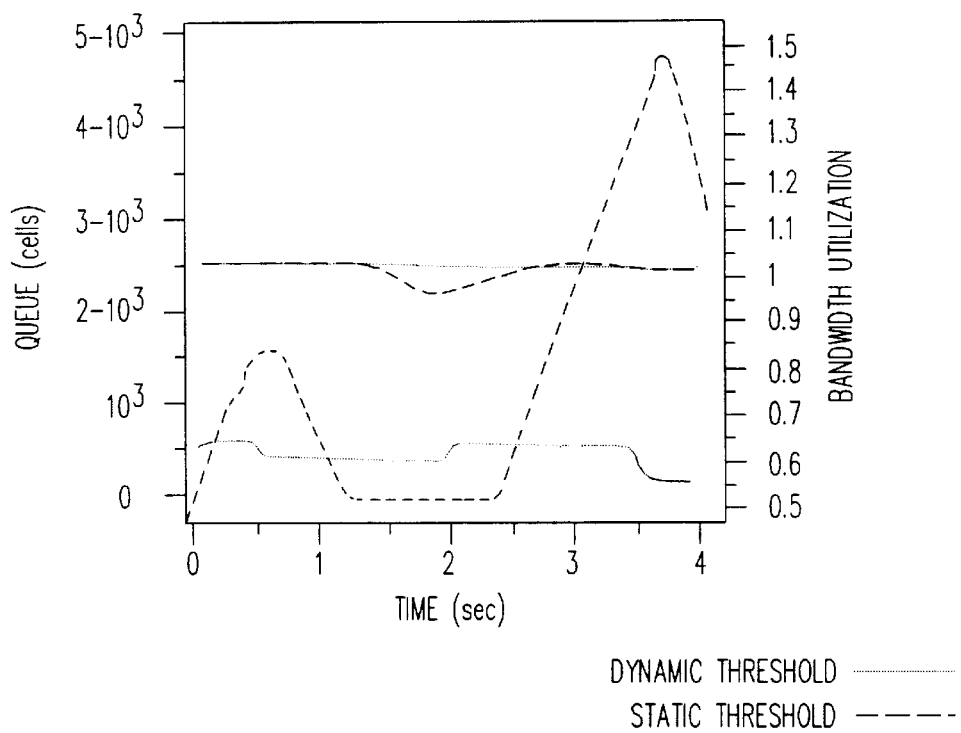
FIG. 7 is a graph showing the relationship between time, queue length in cells, and bandwidth utilization for a virtual circuit.

FIG. 7 explains why such a loss of bandwidth occurs without AQT. Static threshold q(t) essentially tracks the dynamics of $-\mu(t)$, consequently hitting both buffer floor and ceiling (see FIG. 7). As also shown in FIG. 7, the bandwidth utilization drops while q(t) hits buffer floor, and hence the user suffers from the loss of bandwidth. On the other hand, if AQT is applied, q(t) remains in the neighborhood of $\epsilon$(=500 cells), maintaining full utilization of bandwidth and no loss. This is because the time-varying dynamics of $\mu(t)$ does not directly affect the dynamics of q(t). Rather, the difference between $\mu(t)$ and $\mu(t-\tau_i)$, $\forall$, does as explained in (10).

Figure 8:
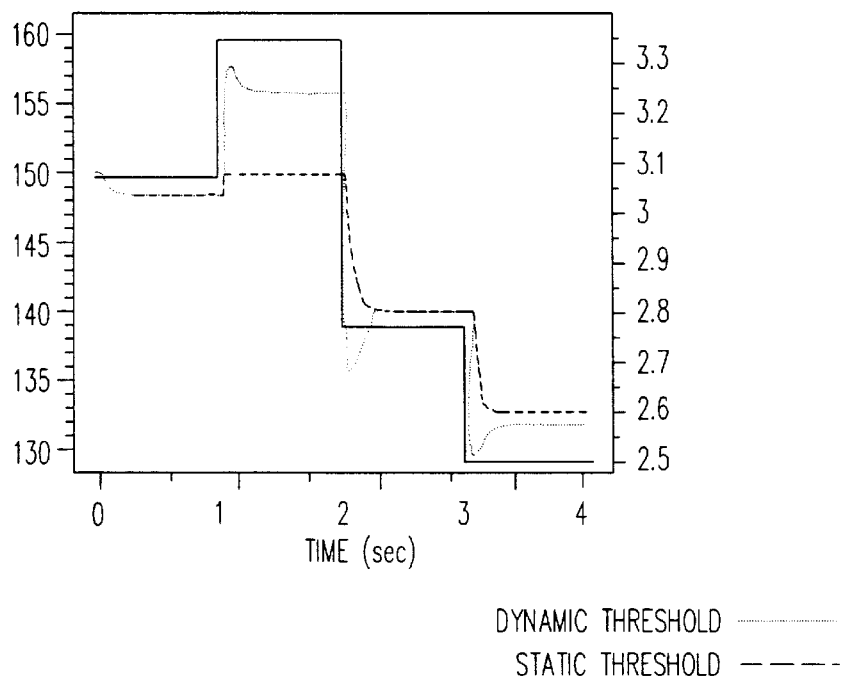
FIG. 8 is a graph showing the relationship between time, available bandwidth, and transfer rates of virtual circuits.
Figure 9:
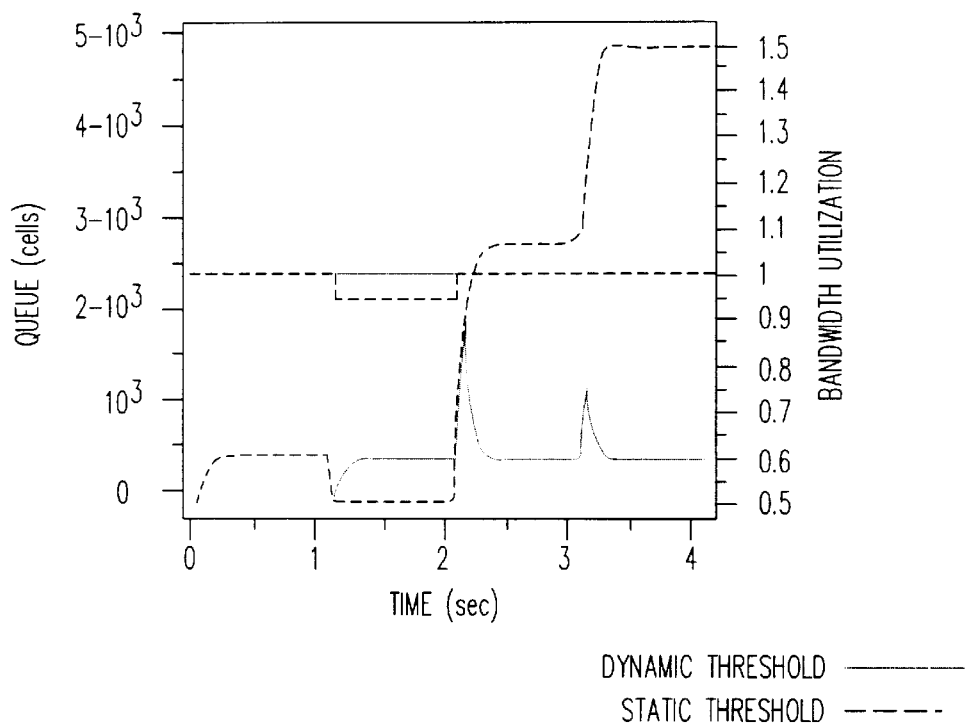
FIG. 9 is a is a graph showing the relationship between time, queue length in cells, and bandwidth utilization for a virtual circuit.

Similarly, compare the performance of first-order rate-based flow control with/without AQT when $\mu(t)$ is piecewise constant with 1 sec intervals. The trajectory of $\mu(t)$ is plotted in FIG. 8 as a solid curve 801. Exactly the same observations are made as in the previous scenario. With AQT, q(t) remains in the neighborhood of $\epsilon$, which is the design parameter, maintaining full utilization of bandwidth and no loss (see FIGS. 8 and 9). It is observed in the trajectory of q(t) in FIG. 9 that the jumps in $\mu(t)$ affect q(t) as impulses so that the effect of jumps vanishes after a certain transient period.

Figure 10:
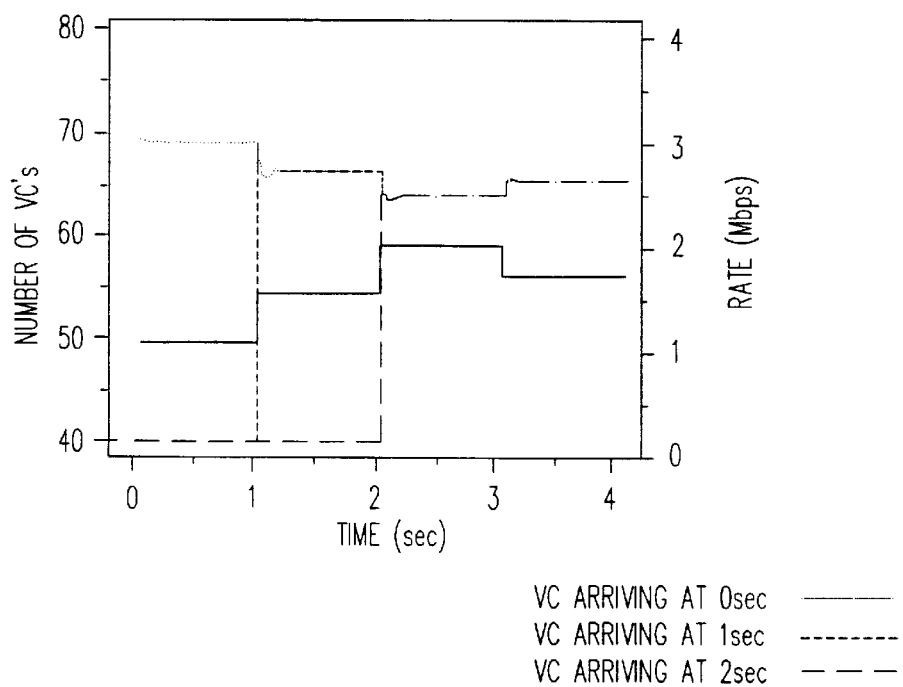
FIG. 10 is a graph showing the relationship between the number of virtual circuits, time, and data transfer rates for virtual circuits.

Finally consider a dynamic scenario where virtual circuit paths arrive and depart. For simplicity, keep $\mu$ constant at 150 Mbps. For the first-order rate-based flow control with static threshold, set $q_T$ at 35,877 cells aiming at $q_\infty$=500 cells with the given I(0). This design implies that if I(t) does not change, q(t) will converge to 500 cells. For the first-order rate-based flow control with AQT, $\epsilon$ was fixed at 500 cells. The trajectory of arrival/departure of virtual circuit paths is plotted in FIG. 10 as a solid curve. Initially there are 50 virtual circuit paths, 5 virtual circuit paths simultaneously arrive at 1, 2 sec and 3 virtual circuit paths depart at 3 sec. Also, in FIG. 10, $r_i(t)$ of three representative virtual circuit paths respectively arriving at 0 sec, 1 sec and 2 sec are shown only for the case with AQT. It is observed that the rates quickly converge to the fair share of the available bandwidth upon arrival and departure of virtual circuit paths.

Figure 11:
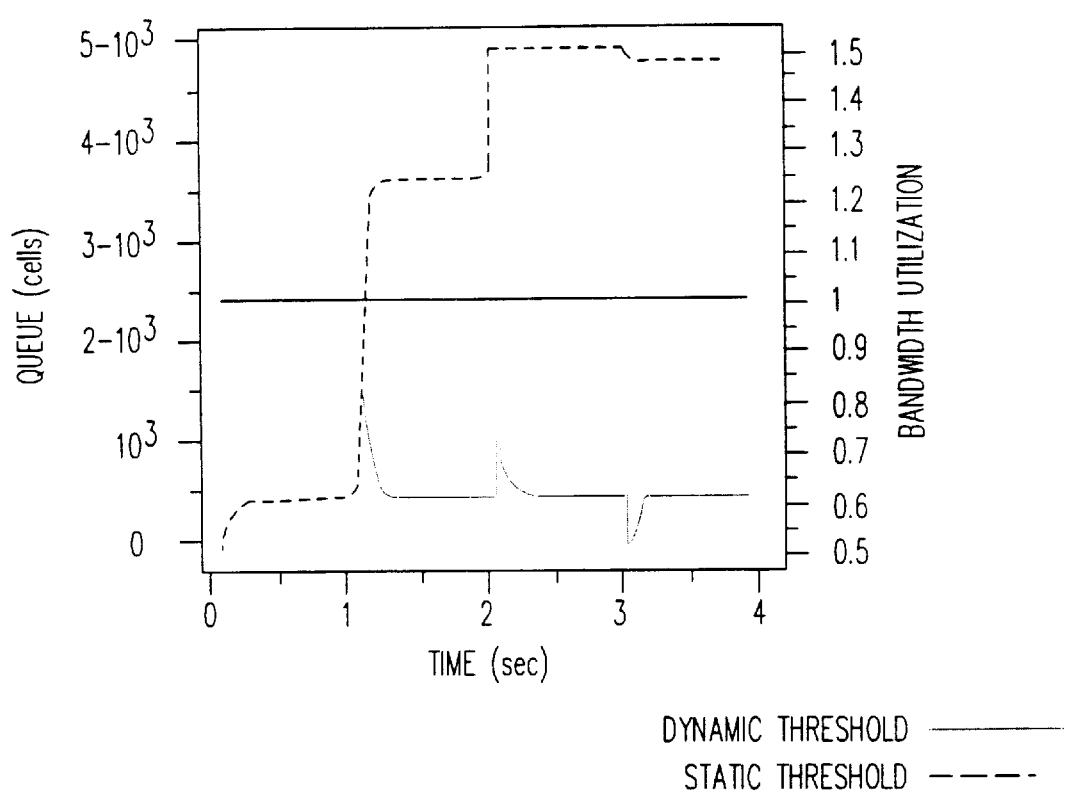
FIG. 11 is a graph showing the relationship between queue length, time, and bandwidth utilization.

The trajectories of q(t) and the bandwidth utilization are found in FIG. 11. Again, the first-order rate-based flow control with AQT outperforms the first-order rate-based flow control without AQT maintaining no loss, full utilization of available bandwidth and small queue. The spikes in q(t) found in the case of the first-order rate-based flow control with AQT is due to the simultaneous arrivals of virtual circuit paths. In practice, these spikes can be mitigated by applying a ceiling to $r_i(t)$s at the source point to restrict the rates, but at the cost of a longer transient period.

We claim:

1. A first-order rate-based flow control method which operates in conjunction with a data communications network including a plurality of interconnected nodes, wherein each node is adapted for connection to any of a plurality of sources, the sources adapted for sending data to, and receiving data from, the nodes, wherein a path that data follows in traveling from a first source, through one or more nodes, to a second source, is a virtual circuit path, and wherein the each node includes a processor and an associated memory for storing a data queue of data received from the sources, the data queue having a current queue length and being associated with a queue threshold, the method characterized by the steps of:

(a) a first node allocating a first data transfer rate to a first source based upon the difference between the current queue length at the first node and the queue threshold of the first node multiplied by a first node gain; the first data transfer rate being allocated by sending a first feedback signal to the first source specifying the first transfer rate; and (b) a second node allocating a second data transfer rate to a second source based upon the difference between the current queue length at the second node and the queue threshold of the second node multiplied by a second node gain;

the second data transfer rate being allocated by sending a second feedback signal to the second source specifying the second transfer rate.

2. The method of claim 1 further including the step of calculating and/or empirically determining a value for the first node gain and the second node gain such that the data communications network is asymptotically stable with no persistent oscillation, irrespective of the number of node-to-node connections in a given virtual circuit path, and also irrespective of a round-trip delay provided by this virtual circuit path.

3. The method of claim 2 further including the step of providing fairness in bandwidth allocation among node-to-node connections by weighting the first node gain and the second node gain.

4. The method of claim 1 further including the step of adaptively changing the queue threshold at each of the nodes along a given virtual circuit path, based upon changes in available bandwidth, and also based upon the establishment and/or discontinuance of source connections at each of the nodes in a given virtual circuit path, thereby providing flow control in a dynamic environment where available bandwidth varies, and node-to-node connections are frequently made and then broken.

* * * * *